(12) United States Patent
Kihara et al.

(10) Patent No.: US 9,893,619 B2
(45) Date of Patent: Feb. 13, 2018

(54) DC/DC CONVERTER

(71) Applicant: Mitsubishi Electric Corporation, Tokyo (JP)

(72) Inventors: Nobuhiro Kihara, Tokyo (JP); Noriyuki Wada, Tokyo (JP); Mitsuyasu Kunihiro, Tokyo (JP); Makoto Akashi, Kobe (JP); Yuta Komatsu, Tokyo (JP); Satoshi Murakami, Tokyo (JP); Yoshihiro Takeshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/249,714

(22) Filed: Aug. 29, 2016

(65) Prior Publication Data

US 2017/0279356 A1   Sep. 28, 2017

(30) Foreign Application Priority Data

Mar. 23, 2016   (JP) ................................. 2016-057985

(51) Int. Cl.
*H02M 3/158* (2006.01)
*H02M 1/36* (2007.01)
*H02P 7/00* (2016.01)

(52) U.S. Cl.
CPC ............. *H02M 3/158* (2013.01); *H02M 1/36* (2013.01); *H02P 7/00* (2013.01)

(58) Field of Classification Search
CPC ...... H02M 3/155; H02M 3/156; H02M 3/157; H02M 3/158; H02M 1/36; Y02B 70/1491
USPC ....... 323/238, 271, 282–285, 321, 351, 901, 323/908
See application file for complete search history.

(56) References Cited

U.S. PATENT DOCUMENTS

| 9,608,512 | B2* | 3/2017 | Zhak ...................... H02M 1/36 |
| 2003/0001552 | A1* | 1/2003 | Fujita ..................... H02M 3/07 323/288 |
| 2003/0042880 | A1 | 3/2003 | Kataoka |
| 2007/0176671 | A1* | 8/2007 | Ishida .................... H02M 3/07 327/536 |
| 2012/0126764 | A1* | 5/2012 | Urakabe ............... H02M 3/158 323/282 |

(Continued)

FOREIGN PATENT DOCUMENTS

| JP | 3501226 B2 | 3/2004 |
| JP | 5457559 B2 | 4/2014 |

*Primary Examiner* — Gary L Laxton
*Assistant Examiner* — Ivan Laboy Andino
(74) *Attorney, Agent, or Firm* — Sughrue Mion, PLLC; Richard C. Turner

(57) ABSTRACT

A DC/DC converter in which a both-end voltage of each of capacitors can be safely uniformalized while an over current, which is passed through between the capacitors composing the DC/DC converter, is prevented. In a DC/DC converter which includes a plurality of switching elements, a reactor, a low-voltage side capacitor, a high-voltage side capacitor, a charge-discharge capacitor, and a controller which drives and controls the switching elements, the controller performs soft start control in which a duty ratio of at least one of the switching elements is gradually varied from 0% to 100%, and the switching element, in which the soft start control is not performed during the term of the soft start control, is turned off.

18 Claims, 11 Drawing Sheets

(56) References Cited

U.S. PATENT DOCUMENTS

| | | | |
|---|---|---|---|
| 2013/0002215 A1* | 1/2013 | Ikeda | H02M 3/158 323/271 |
| 2013/0119961 A1 | 5/2013 | Okuda et al. | |
| 2014/0152276 A1* | 6/2014 | Kobayashi | H02M 3/158 323/271 |
| 2014/0266134 A1* | 9/2014 | Zhak | H02M 1/36 323/311 |
| 2016/0118888 A1* | 4/2016 | Xu | H02M 1/36 323/235 |
| 2016/0254689 A1* | 9/2016 | Lee | H02J 7/0072 320/107 |
| 2016/0329809 A1* | 11/2016 | Granato | H02M 3/158 |
| 2016/0352219 A1* | 12/2016 | Amgad Abdulslam | H02M 1/08 |

\* cited by examiner

DC/DC CONVERTER

BACKGROUND OF THE INVENTION

1. Field of the Invention

The present invention relates to a DC/DC converter.

2. Description of the Related

There is a conventional DC/DC converter which includes a terminal group, a reactor, a switching element series circuit, a charge-discharge capacitor, and a smoothing capacitor, in a state where the terminal group includes a first terminal, a second terminal, a third terminal, and a fourth terminal, and the switching element series circuit includes a first switching element, a second switching element, a third switching element, and a fourth switching element, which are connected in series. A connection point of the second switching element and the third switching element is connected to the first terminal via the reactor, and an opposite side of a connection point of the first switching element and the second switching element is connected to the second terminal, and the charge-discharge capacitor is connected between the connection point of the first switching element and the second switching element and a connection point of the third switching element and the fourth switching element, and the smoothing capacitor is connected to the switching element series circuit in parallel, and the switching element series circuit is connected to the third terminal and the fourth terminal, and the first terminal and the second terminal are used as low-voltage-side terminals, and the third terminal and the fourth terminal are used as high-voltage-side terminals, and a DC voltage is converted between the low-voltage-side terminals and the high-voltage-side terminals. A control device includes a first calculation means, a second calculation means, and an open-close control means. The first calculation means calculates a first calculation value in accordance with a difference voltage between a high-voltage-side voltage instruction value, which is a voltage instruction value at a high-voltage side, and a high-voltage-side voltage detection value, which is a voltage detection value at a high-voltage side, or in accordance with a difference voltage between a low-voltage-side voltage instruction value, which is a voltage instruction value at a low-voltage side, and a low-voltage-side voltage detection value, which is a voltage detection value at a low-voltage side. The second calculation means calculates a second calculation value in accordance with a difference voltage between a voltage instruction value of the charge-discharge capacitor and a voltage detection value of the charge-discharge capacitor. The open-close control means calculates an energization ratio in accordance with the first calculation value and the second calculation value, and controls an open-close operation of the first switching element, the second switching element, the third switching element, and the fourth switching element in accordance with the energization ratio (for example, refer to Patent Document 1).

Moreover, there is a non-insulated type DC/DC converter, as a conventional DC/DC converter according to another example, which includes at least two switching elements connected to a coil, and performs a DC power conversion in such a way that the two switching elements are reversely operated each other by a control circuit, in which the control circuit performs soft start control, in which on-duty time of one switching element is gradually increased, when an operation is started, and the other switching element is turned off during the soft start control (for example, refer to Patent Document 2).

[Patent Document 1]
    Japanese Patent Publication No. 5457559
[Patent Document 2]
    Japanese Patent Publication No. 3501226

However, in a DC/DC converter which is described in Patent Document 1, a phase difference between a gate signal of a first switching element and a gate signal of a second switching element is controlled as 180°, and a gate signal of the first switching element and a gate signal of a fourth switching element are controlled as a complementary relation, and a gate signal of a second switching element and a gate signal of a third switching element are controlled as a complementary relation, so that a duty ratio of the first switching element and a duty ratio of the third switching element cannot be set as 1, and a both-end voltage of a low-voltage side capacitor and a both-end voltage of a charge-discharge capacitor cannot be uniformalized. Moreover, when a voltage is increased and a high-voltage side voltage instruction value is rapidly varied to a low value which is a low-voltage side voltage level, a duty ratio of the third switching element and a duty ratio of the fourth switching element are rapidly increased, so that an over current, which is corresponding to a difference between both-end voltages of a low-voltage side capacitor and a high-voltage side capacitor, is passed between the low-voltage side capacitor and the high-voltage side capacitor, and a low-voltage side voltage and a high-voltage side voltage are uniformalized. Therefore, in this case, there is a fear in which a switching element or a capacitor is destroyed by an over current, and a reactor is deteriorated. In other words, the both-end voltages of the low-voltage side capacitor and the high-voltage side capacitor cannot be safely uniformalized without passing an over current.

Moreover, in a DC/DC converter which is described in Patent Document 2, a switching element, which is connected to a coil, is softly started, so that when the soft start operation is applied to the DC/DC converter, which is described in Patent Document 2, a Ci voltage (VCi) and a Cf voltage (VCf) are not varied during a soft start term. After that, when an operation is shifted to a normal operation and a switching element S1 is turned on, an over current, which is corresponding to a difference between the VCi and the VCf, is passed through a passage of Ci→L→S3→Cf→S1, so that there is a fear in which a switching element or a capacitor is destroyed by an over current, and a reactor is deteriorated.

SUMMARY OF THE INVENTION

The present invention has been made to solve above-described problems, and an object of the invention is to obtain a DC/DC converter in which an over current, which is passed between capacitors composing the DC/DC converter, is prevented, and both-end voltages of each of the capacitors are safely uniformalized.

A DC/DC converter includes a plurality of switching elements; a reactor; a low-voltage side capacitor; a high-voltage side capacitor; a charge-discharge capacitor; and a control means which drives and controls the switching elements; in which the plurality of switching elements include a first switching element in which a first terminal is connected to a negative pole of the low-voltage side capacitor; a second switching element in which a first terminal is connected to a second terminal of the first switching element, and a second terminal is connected to a positive pole of the low-voltage side capacitor via the reactor; a third switching element in which a first terminal is connected to the second terminal of the second switching element; and a fourth switching element in which a first terminal is connected to a second terminal of the third switching element, and a second terminal is connected to a positive pole of the high-voltage side capacitor; and in which the charge-discharge capacitor is connected between a connection point of the first switching element and the second switching element and a connection point of the third switching element and the fourth switching element; wherein the control means performs soft start control in which a duty ratio of at least one of the switching elements is gradually varied from 0% to 100%, and the switching element, in which the soft start control is not performed during a term of the soft start control, is turned off, whereby a both-end voltage of the low-voltage side capacitor is uniformalized to a both-end voltage of the charge-discharge capacitor, or the both-end voltage of the low-voltage side capacitor is uniformalized to a both-end voltage of the high-voltage side capacitor.

In a DC/DC converter of the present invention, an over current, which is passed between capacitors, is prevented, and both-end voltages of each of the capacitors can be safely uniformalized. Moreover, the over current is prevented, whereby each of configuration components can be downsized, and a size and a cost of the overall device can be reduced.

DETAILED DESCRIPTION OF THE INVENTION

Hereinafter, embodiments of the present invention will be explained in reference to drawings. In addition, reference symbols, which are the same as those in each of FIG. 1 through FIG. 12, refer to the same or equivalent parts.

Embodiment 1

Hereinafter, a DC/DC converter according to Embodiment 1 of the present invention will be explained.

Figure 1:
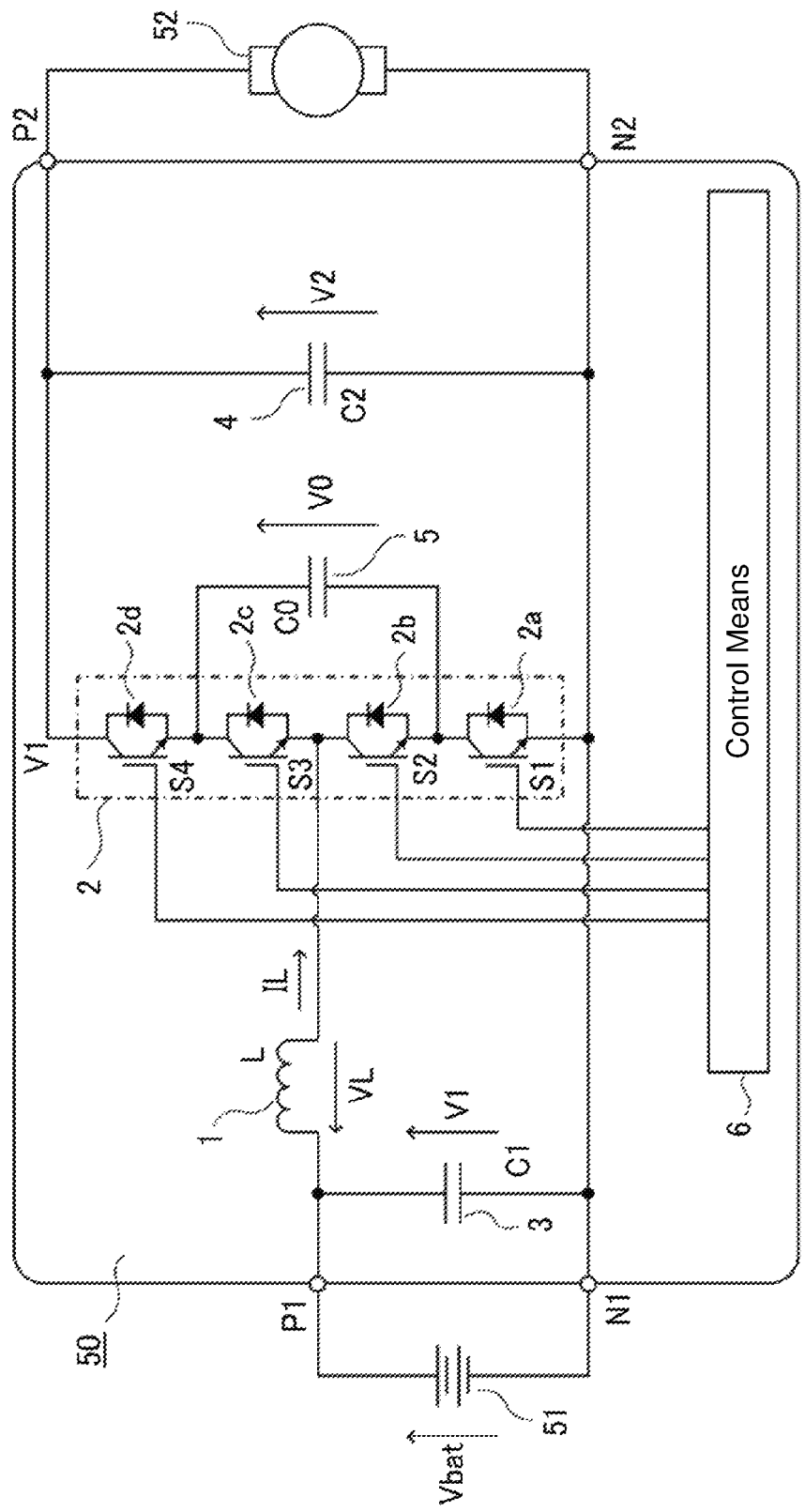
FIG. 1 is a circuit diagram illustrating a DC/DC converter according to Embodiment 1 of the present invention.

FIG. 1 is a circuit diagram for explaining the DC/DC converter according to Embodiment 1 of the present invention.

As illustrated in FIG. 1, a DC/DC converter (electric power converter) 50 is composed of a reactor 1, a semiconductor module 2 which includes a first semiconductor switching element 2a, a second semiconductor switching element 2b, a third semiconductor switching element 2c, and a fourth semiconductor switching element 2d, a low-voltage side capacitor 3, a high-voltage side capacitor 4, a charge-discharge capacitor 5, and a control means 6 which controls the first semiconductor switching element 2a, the second semiconductor switching element 2b, the third semiconductor switching element 2c, and the fourth semiconductor switching element 2d. Moreover, a high-voltage battery 51 is connected at a low-voltage side (between P1 and N1) of the DC/DC converter 50, and an electric motor 52 is connected at a high-voltage side (between P2 and N2) of the DC/DC converter 50. In addition, each of the first semiconductor switching element 2a, the second semiconductor switching element 2b, the third semiconductor switching element 2c, and the fourth semiconductor switching element 2d is composed of, for example, an IGBT (Insulated Gate Bipolar Transistor), and a diode which is connected to the IGBT in reverse and parallel.

In FIG. 1, the DC/DC converter 50 is a two-way-type converter which can convert electric power in two ways between a low-voltage side and a high-voltage side, and an input voltage (low-voltage side voltage) V1, which is inputted between P1 and N1 (terminals at the low-voltage side), is increased at a voltage which is higher than the input voltage V1, and an output voltage (high-voltage side voltage) V2, which is increased, is outputted between P2 and N2 (terminals at the high-voltage side). In addition, the voltage V1 and the voltage V2 are simply described as the V1 and the V2 in the following description. One end terminal of the first semiconductor switching element 2a is connected to a negative-pole side terminal of the low-voltage side capacitor 3. One end terminal of the second semiconductor switching element 2b is connected to the other end terminal of the first semiconductor switching element 2a, and the other end terminal of the second semiconductor switching element 2b is connected to a positive-pole side terminal of the low-voltage side capacitor 3 via the reactor 1. One end terminal of the third semiconductor switching element 2c is connected to the other end terminal of the second semiconductor switching element 2b. One end terminal of the fourth semiconductor switching element 2d is connected to the other end terminal of third semiconductor switching element 2c, and the other end terminal of the fourth semiconductor switching element 2d is connected to a positive-pole side terminal of the high-voltage side capacitor 4. Moreover, one end terminal of the charge-discharge capacitor 5 is connected to a middle connection point between the first semiconductor switching element 2a and the second semiconductor switching element 2b, and the other end terminal of the charge-discharge capacitor 5 is connected to a middle connection point between the third semiconductor switching element 2c and fourth semiconductor switching element 2d.

The low-voltage side capacitor 3 smoothes the V1. The reactor 1 is used for accumulating energy. The V1 is increased to the V2 by the semiconductor module 2 and the charge-discharge capacitor 5. In addition, each of the semiconductor switching element 2a, the semiconductor switching element 2b, the semiconductor switching element 2c, and the semiconductor switching element 2d of the semiconductor module 2 is turned on when a gate signal is set as a high mode in Embodiment 1. The high-voltage side capacitor 4 smoothes the V2. The control means 6 generates a gate signal of each of the semiconductor switching element 2a, the semiconductor switching element 2b, the semiconductor switching element 2c, and the semiconductor switching element 2d, whereby each of the semiconductor switching element 2a, the semiconductor switching element 2b, the semiconductor switching element 2c, and the semiconductor switching element 2d is turned on or turned off.

Figure 2:
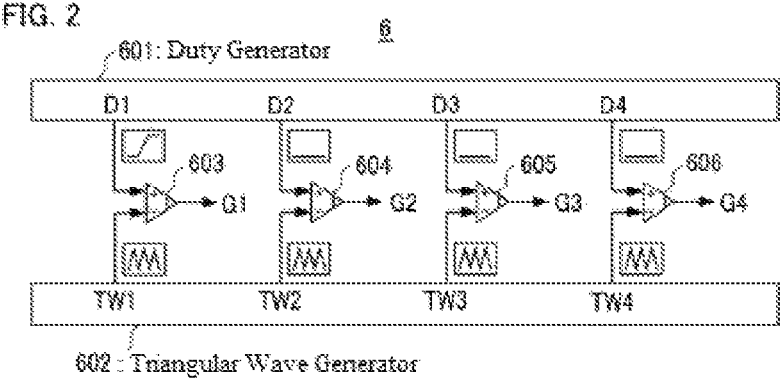
FIG. 2 is a block diagram illustrating a control means which performs soft start control in the DC/DC converter according to Embodiment 1 of the present invention.

FIG. 2 is a block diagram of a control means which performs soft start control in the DC/DC converter 50 according to Embodiment 1 of the present invention As indicated in FIG. 2, the control means 6 is composed of a duty generator 601, a triangular wave generator 602, a comparator 603, a comparator 604, a comparator 605, and a comparator 606. The duty generator 601 generates a duty ratio D1 through a duty ratio D4. The triangular wave generator 602 generates a triangular wave TW1 through a triangular wave TW4. In this case, each of frequencies of the triangular wave TW1 through the triangular wave TW4 is similar to a frequency in a normal operation state in which soft start control is not performed. Moreover, each of phase difference of the triangular wave TW1 through the triangular wave TW4 is set as 0°. A gate signal G1 is generated by comparing the duty ratio D1 to the triangular wave TW1 by the comparator 603. In this case, the duty ratio D1 is linearly varied from 0 to 1 during soft start time Tsoft1. Therefore, the signal G1 is alternately varied between a low level (off) and a high level (on), and on time of a waveform is gradually extended. Moreover, a gate signal G2 is generated by comparing the duty ratio D2 to the triangular wave TW2 by the comparator 604. Moreover, a gate signal G3 is generated by comparing the duty ratio D3 to the triangular wave TW3 by the comparator 605. Furthermore, a gate signal G4 is generated by comparing the duty ratio D4 to the triangular wave TW4 by the comparator 606. In this case, each of the duty ratio D2 through the duty ratio D4 is constantly set as 0. Therefore, each of the gate signal G2 through the gate signal G4 is constantly set as a low level (off).

Figure 3:
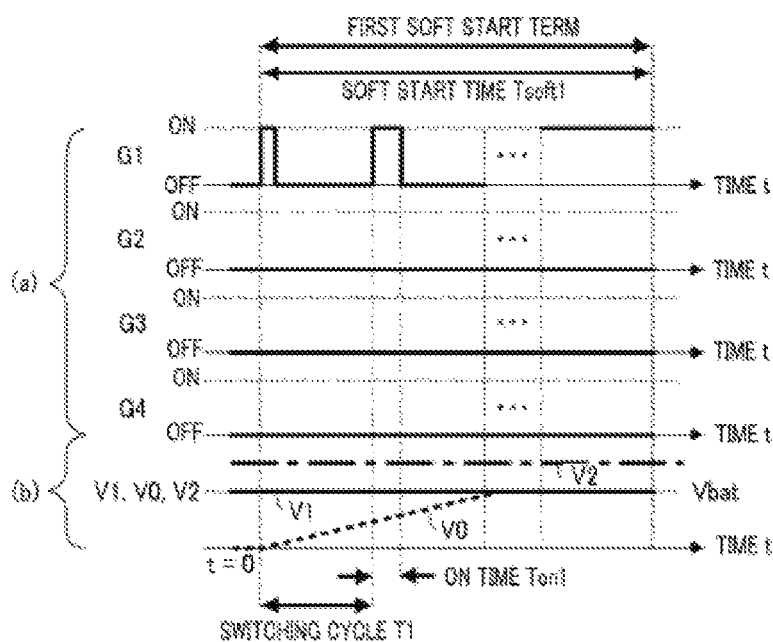
FIG. 3 is a timing chart for explaining the soft start control in the DC/DC converter according to Embodiment 1 of the present invention.

FIG. 3 is a timing chart for explaining the soft start control in the DC/DC converter according to Embodiment 1 of the present invention. A waveform group (a), which is illustrated in FIG. 3, is a timing chart which indicates a switching pattern of each of the semiconductor switching element 2a, the semiconductor switching element 2b, the semiconductor switching element 2c, and the semiconductor switching element 2d, and a waveform group (b), which is illustrated in FIG. 3, is a timing chart which indicates the V1, a V0 (a middle voltage which is a both-end voltage of the charge-discharge capacitor 5), and the V2. As indicated in the waveform group (a), which is illustrated in FIG. 3, soft start control, in which the gate signal G1 of the semiconductor switching element 2a is gradually varied from 0% to 100% during soft start time Tsoft1 (first soft start term) from time (t=0), is performed, and the gate signal G2 of the semiconductor switching element 2b, the gate signal G3 of the semiconductor switching element 2c, and the gate signal G4 of the semiconductor switching element 2d, in which soft start control is not performed, are turned off. As indicated in the waveform group (b), which is illustrated in FIG. 3, in a case where each of voltage values is represented as V2>V1=Vbat>V0 in a state where a both-end voltage of the high-voltage battery 51 is the Vbat, and t=0, when soft start control is started and the gate signal G1 turned on, electric current is passed through a passage of the low-voltage side capacitor 3 (battery C1)→the reactor 1 (L)→the semiconductor switching element 2c (S3)→the charge-discharge capacitor 5 (C0)→the semiconductor switching element 2a (S1), and the V0 is increased, and each of voltage values is gradually converged as V1=V0=Vbat. The soft start time Tsoft1 is previously determined by using a simulation or the like in such a way that a component, in which a rated electric current is the smallest, is not destroyed, and an electric current, which is passed between the capacitors, is lower than the rated electric current of the component. In addition, an electric current, which is passed in proportional to a potential difference between the capacitors, is increased, so that the soft start time Tsoft1 may be calculated by using a simulation or the like in accordance with a condition of a maximum potential difference which is estimated.

The control means 6 performs soft start control, in which a duty ratio of at least one of the switching elements is gradually varied from 0% to 100%, and the switching element, in which the soft start control is not performed during the term in which the soft start control is performed, is turned off, whereby a both-end voltage of the low-voltage side capacitor 3 is uniformalized to a both-end voltage of the charge-discharge capacitor 5, or the both-end voltage of the low-voltage side capacitor 3 is uniformalized to a both-end voltage of high-voltage side capacitor 4. These operations are similarly performed in the embodiments which are explained in the following description.

As described above, the soft start control of each of the switching element 2a, the switching element 2b, the switching element 2c, and the switching element 2d is performed, whereby when the low-voltage side voltage V1 is higher than the middle voltage V0, the V1 and the V0 can be safely uniformalized in a state where a voltage sensor is not used, while an over current, which is passed through between the low-voltage side capacitor 3 (C1) and the charge-discharge capacitor 5 (C0), is prevented. Moreover, the over current is prevented, whereby each of configuration components can be downsized, and a size and a cost of the overall device can be reduced.

Figure 4:
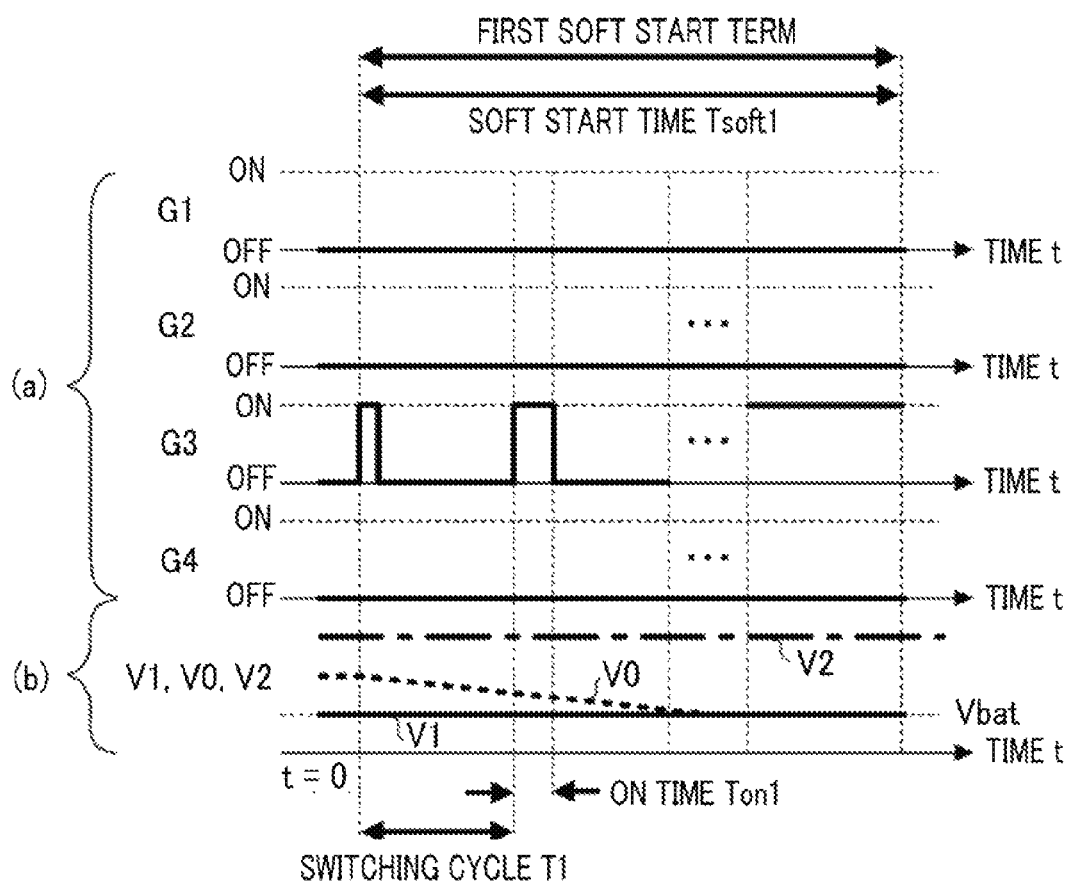
FIG. 4 is a timing chart for explaining soft start control, in accordance with the other switching pattern, in the DC/DC converter according to Embodiment 1 of the present invention.

Moreover, FIG. 4 is a timing chart for explaining soft start control, in accordance with the other switching pattern, in the DC/DC converter according to Embodiment 1 of the present invention. A waveform group (a), which is illustrated in FIG. 4, is a timing chart which indicates a switching pattern of each of the semiconductor switching element 2a, the semiconductor switching element 2b, the semiconductor switching element 2c, and the semiconductor switching element 2d, and a waveform group (b), which is illustrated in FIG. 4, is a timing chart which indicates the V1, the V0, and the V2. As indicated in the waveform group (a), which is illustrated in FIG. 4, soft start control, in which the duty ratio D1, the duty ratio D2, and the duty ratio D4, which are generated from the duty generator 601, are constantly set as 0 by the control means 6 between time t=0 and soft start time Tsoft1 (first soft start term), and the duty ratio D3 is linearly varied from 0 to 1 during the soft start time Tsoft1, and the gate signal G3 of the semiconductor switching element 2c is gradually varied from 0% to 100%, is performed, and the gate signal G1 of the semiconductor switching element 2a, the gate signal G2 of the semiconductor switching element 2b, and the gate signal G4 of the semiconductor switching element 2d are turned off. In addition, each of frequencies of the triangular wave TW1 through the triangular wave TW4, which are generated from the triangular wave generator 602, is similar to a frequency in a normal operation state in which soft start control is not performed. Moreover, as indicated in the waveform group (b), which is illustrated in FIG. 4, in a case where each of voltage values is represented as V2>V1>V0=Vbat in a state where a both-end voltage of the high-voltage battery 51 is the Vbat, and t=0, when soft start control is started and the gate signal G3 is turned on, electric current is passed through a passage of S1→C0→the semiconductor switching element 2c (S3)→L→the low-voltage side capacitor 3 (battery C1), and the V0 is decreased, and each of voltage values is gradually converged as V1=V0=Vbat.

As described above, the soft start control of each of the switching element 2a, the switching element 2b, the switching element 2c, and the switching element 2d is performed, whereby when the low-voltage side voltage V1 is lower than the middle voltage V0, the V1 and the V0 can be safely uniformalized in a state where a voltage sensor is not used, while an over current, which is passed through between the low-voltage side capacitor 3 (C1) and the charge-discharge capacitor 5 (C0) is prevented. Moreover, the over current is prevented, whereby each of configuration components can be downsized, and a size and a cost of the overall device can be reduced.

Figure 5:
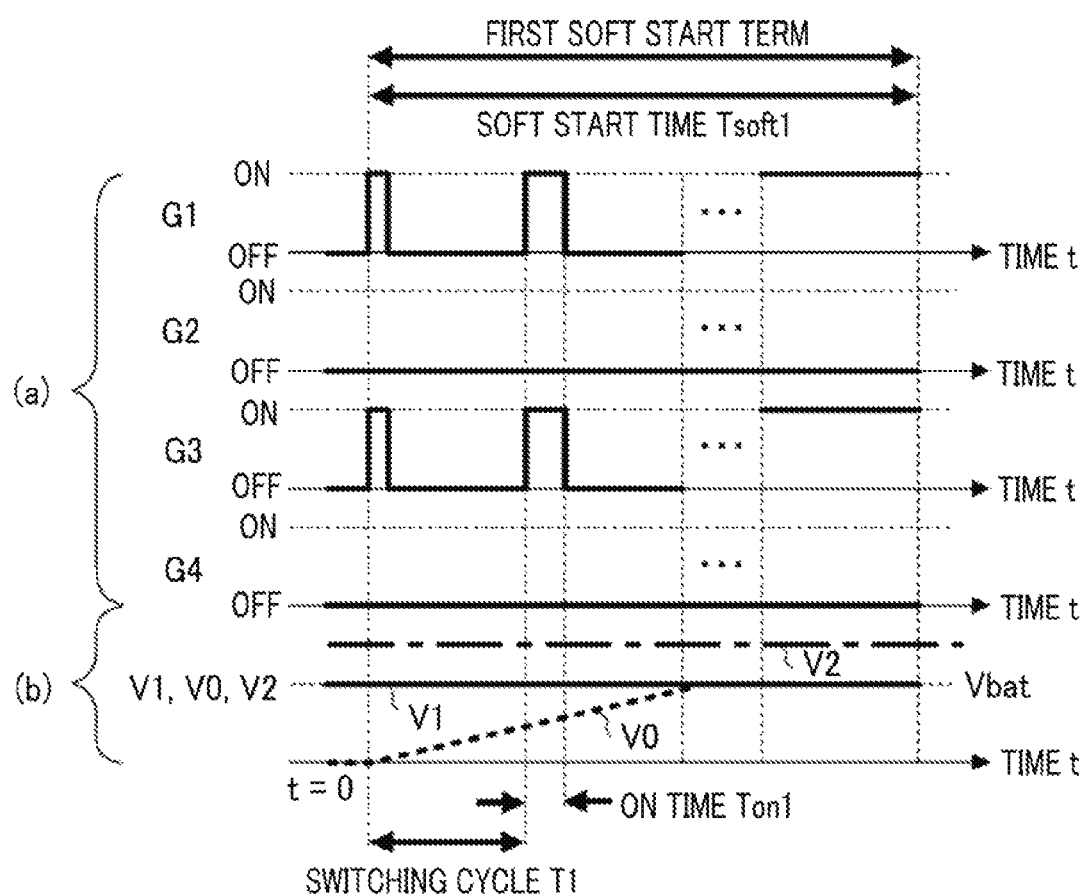
FIG. 5 is a timing chart for explaining soft start control, in accordance with the further other switching pattern, in the DC/DC converter according to Embodiment 1 of the present invention.

FIG. 5 is a timing chart for explaining soft start control, in accordance with the further other switching pattern, in the DC/DC converter according to Embodiment 1 of the present invention. A waveform group (a), which is illustrated in FIG. 5, is a timing chart which indicates a switching pattern of each of the semiconductor switching element 2a, the semiconductor switching element 2b, the semiconductor switching element 2c, and the semiconductor switching element 2d, and a waveform group (b), which is illustrated in FIG. 5, is a timing chart which indicates the V1, the V0, and the V2. As indicated in the waveform group (a), which is illustrated in FIG. 5, soft start control, in which the duty ratio D2 and the duty ratio D4, which are generated from the duty generator 601, are constantly set as 0 by the control means 6 between time t=0 and soft start time Tsoft1 (first soft start term), and the duty ratio D1 and the duty ratio D3 are linearly varied from 0 to 1 during the soft start time Tsoft1, and the gate signal G1 of the semiconductor switching element 2a and the gate signal G3 of the semiconductor switching element 2c are gradually varied from 0% to 100%, is performed, and the gate signal G2 of the semiconductor switching element 2b and the gate signal G4 of the semiconductor switching element 2d are turned off. In addition, each of frequencies of the triangular wave TW1 through the triangular wave TW4, which are generated from the triangular wave generator 602, is similar to a frequency in a normal operation state in which soft start control is not performed. Moreover, as indicated in the waveform group (b), which is illustrated in FIG. 5, in a case where each of voltage values is represented as V2>V1=Vbat>V0 in a state where t=0, when soft start control is started and the gate signal G1 is turned on, electric current is passed through a passage of a battery (C1)→L→S3→C0→S1, and the V0 is increased, and each of voltage values is gradually converged as V1=V0=Vbat. Moreover, although the following case is not illustrated in FIG. 5, in a case where each of voltage values is represented as V2>V0>V1=Vbat in a state where t=0, when soft start control is started and the gate signal G3 is turned on, electric current is passed through a passage of S1→C0→S3→L→the battery (C1), and the V0 is decreased, and each of voltage values is gradually converged as V1=V0=Vbat.

As described above, the soft start control of each of the switching element 2a, the switching element 2b, the switching element 2c, and the switching element 2d is performed, whereby when the low-voltage side voltage V1 is higher than the middle voltage V0, or the low-voltage side voltage V1 is lower than the middle voltage V0, the V1 and the V0 can be safely uniformalized in a state where a voltage sensor is not used, while an over current, which is passed through between the low-voltage side capacitor 3 (C1) and the charge-discharge capacitor 5 (C0), is prevented. Moreover, the over current is prevented, whereby each of configuration components can be downsized, and a size and a cost of the overall device can be reduced. In addition, a switching pattern indicated in FIG. 7, which is described later, may be used.

Figure 6:
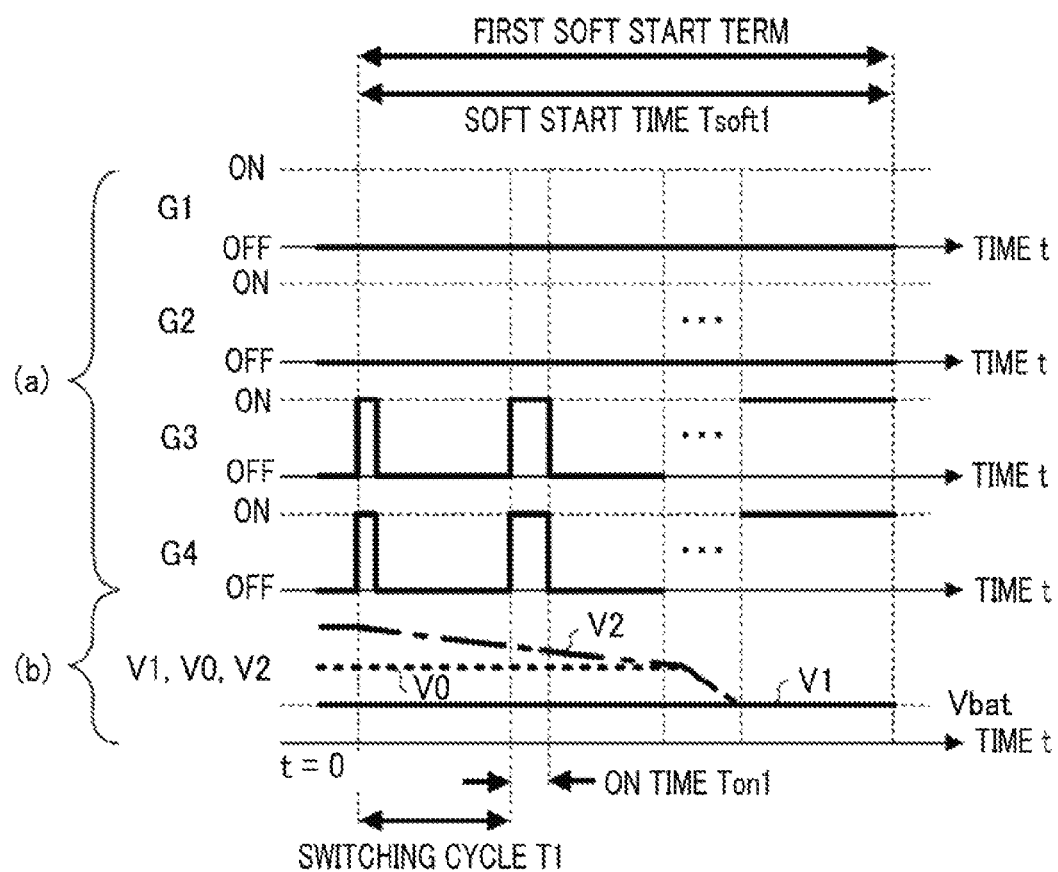
FIG. 6 is a timing chart for explaining soft start control, in accordance with the further other switching pattern, in the DC/DC converter according to Embodiment 1 of the present invention.

FIG. 6 is a timing chart for explaining soft start control, in accordance with the further other switching pattern, in the DC/DC converter according to Embodiment 1 of the present invention. A waveform group (a), which is illustrated in FIG. 6, is a timing chart which indicates a switching pattern of each of the semiconductor switching element 2a, the semiconductor switching element 2b, the semiconductor switching element 2c, and the semiconductor switching element 2d, and a waveform group (b), which is illustrated in FIG. 6, is a timing chart which indicates the V1, the V0, and the V2. As indicated in the waveform group (a), which is illustrated in FIG. 6, soft start control, in which the duty ratio D1 and the duty ratio D2, which are generated from the duty generator 601, are constantly set as 0 by the control means 6 between time t=0 and soft start time Tsoft1 (first soft start term), and the duty ratio D3 and the duty ratio D4 are linearly varied from 0 to 1 during the soft start time Tsoft1, and the gate signal G3 of the semiconductor switching element 2c and the gate signal G4 of the semiconductor switching element 2d are gradually varied from 0% to 100%, is performed, and the gate signal G1 of the semiconductor switching element 2a and the gate signal G2 of the semiconductor switching element 2b are turned off. In addition, each of frequencies of the triangular wave TW1 through the triangular wave TW4, which are generated from the triangular wave generator 602, is similar to a frequency in a normal operation state in which soft-start control is not performed. Moreover, as indicated in the waveform group (b), which is illustrated in FIG. 6, in a case where each of voltage values is represented as V2>V0>V1=Vbat in a state where a both-end voltage of the high-voltage battery 51 is the Vbat, and t=0, when soft start control is started and the gate signal G3 and the gate signal G4 are turned on, electric current is passed through a passage of the high-voltage side capacitor 4 (C2)→the semiconductor switching element 2d (S4)→S3→L→the battery (C1), and the V2 is decreased, and each of voltage values is gradually converged as V2=V0. After that, when the gate signal G3 and the gate signal G4 are turned on, electric current is passed through a passage of C2 (C0)→S3→L→the battery (C1), and the V2 and the V0 are also decreased, and each of voltage values is gradually converged as V2=V0=V1=Vbat. In other words, the V1, the V0, and the V2 can be safely uniformalized, while an over current, which is passed through between the capacitors, is prevented by the soft start control. Moreover, each of voltage values is converged as V1=V2, so that a mode of each of the components can be safely shifted to a direct connection mode (a mode in which a low-voltage side voltage is directly applied to a high-voltage side). Moreover, although the following case is not illustrated in FIG. 6, in a case where each of voltage values is represented as V2>V1>Vbat=V0 in a state where t=0, when the soft start control is started and the gate signal G3 and the gate signal G4 are turned on, electric current is passed through a passage of C2→S4→S3→L→the battery (C1), and the V2 is decreased, and each of voltage values is gradually converged as V2=V1=Vbat.

As described above, the soft start control of each of the switching element $2a$, the switching element $2b$, the switching element $2c$, and the switching element $2d$ is performed, whereby when the low-voltage side voltage V1 is lower than the high-voltage side voltage V2, the V1 and the V2 can be safely uniformalized in a state where a voltage sensor is not used, while an over current, which is passed through between the low-voltage side capacitor $3$ (C1) and the high-voltage side capacitor $4$ (C2) is prevented. In other words, the V1 and the V2 can be safely uniformalized (the V1 and the V2 can be safely shifted to a direct connection mode), while an over current, which is passed through between the capacitors, is prevented by the soft start control. Moreover, the over current is prevented, whereby each of configuration components can be downsized, and a size and a cost of the overall device can be reduced.

Figure 7:
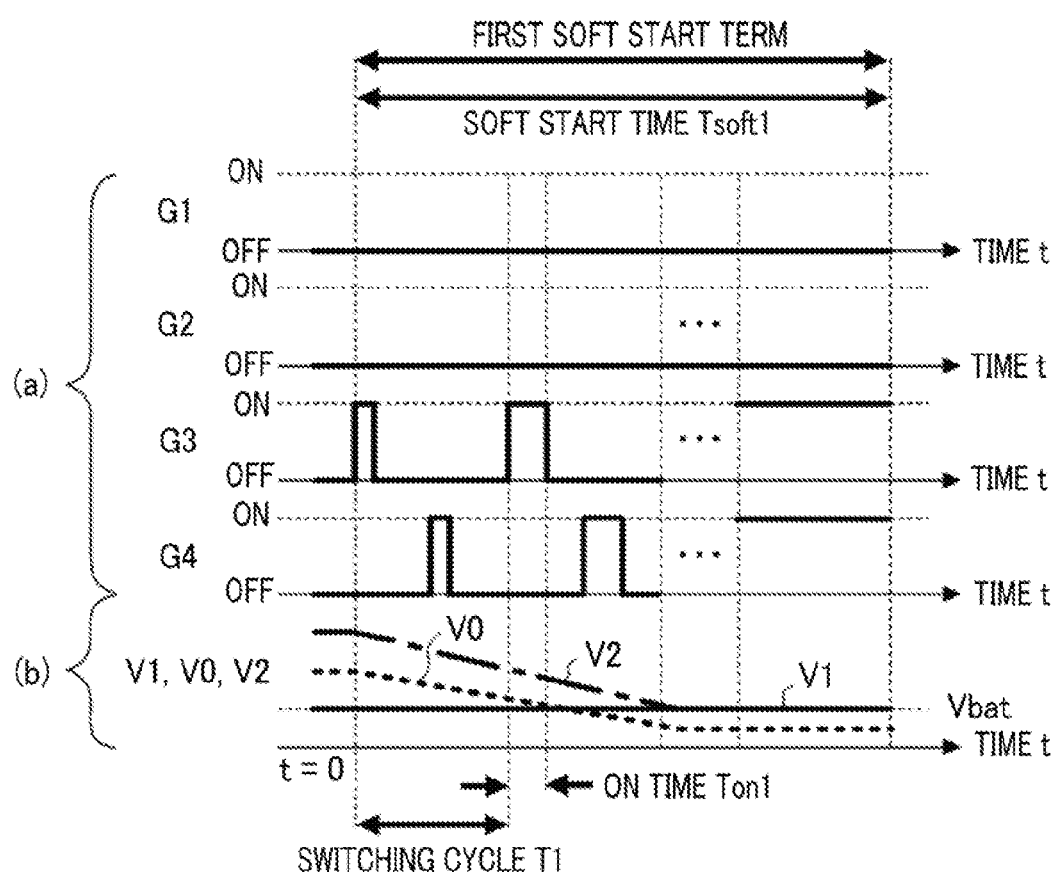
FIG. 7 is a timing chart for explaining soft start control, in accordance with the further other switching pattern, in the DC/DC converter according to Embodiment 1 of the present invention.

Moreover, FIG. 7 is a timing chart for explaining soft start control, in accordance with the further other switching pattern, in the DC/DC converter according to Embodiment 1 of the present invention. A waveform group (a), which is illustrated in FIG. 7, is a timing chart which indicates a switching pattern of each of the semiconductor switching element $2a$, the semiconductor switching element $2b$, the semiconductor switching element $2c$, and the semiconductor switching element $2d$, and a waveform group (b), which is illustrated in FIG. 7, is a timing chart which indicates the V1, the V0, and the V2. As indicated in the waveform group (a), which is illustrated in FIG. 7, the soft start control, in which the duty ratio D1 and the duty ratio D2, which are generated from the duty generator 601, are constantly set as 0 by the control means 6 between time t=0 and soft start time Tsoft1 (first soft start term), and the duty ratio D3 and the duty ratio D4 are linearly varied from 0 to 1 during the soft start time Tsoft1, and the gate signal G3 of the semiconductor switching element $2c$ and the gate signal G4 of the semiconductor switching element $2d$ are gradually varied from 0% to 100%, in a state where a phase differences between the gate signal G3 and the gate signal G4 is 180°, is performed, and the gate signal G1 of the semiconductor switching element $2a$ and the gate signal G2 of the semiconductor switching element $2b$ are turned off. In this case, each of frequencies of the triangular wave TW1 through the triangular wave TW4, which are generated from the triangular wave generator 602, is similar to a frequency in a normal operation state in which soft start control is not performed. In addition, a phase difference of the triangular wave TW4 with respect to the triangular wave TW1 through the triangular wave TW3 is set as 180°. Moreover, as indicated in the waveform group (b), which is illustrated in FIG. 7, in a case where each of voltage values is represented as V2>V0>V1=Vbat in a state where a both-end voltage of the high-voltage battery 51 is the Vbat, and t=0, when soft start control is started and the gate signal G3 is turned on, electric current is passed through a passage of S1→C0→S3→L→the battery (C1), and when the gate signal G4 is turned on, electric current is passed through a passage of C2→S4→C0→the semiconductor switching element $2b$ (S2)→L→the battery (C1), and the V2 and the V0 are decreased, and each of voltage values is gradually converged as V2=V1=Vbat.

In this case, electric current IL, which is passed through the reactor 1, is represented by the following Formula (1). "VL" is a both-end voltage of the reactor 1, "L" is an inductance of the reactor 1, "D" is a duty ratio of the semiconductor switching element, and "T1" is a switching cycle of the semiconductor switching element.

$$IL=(VL/L)\times D\times T1 \qquad \text{Formula (1)}$$

As described, above, when the gate signal G3 is turned on, electric current is passed through a passage of S1→C0→S3→L→the battery (C1), so that the both-end voltage VL of the reactor 1 is represented as "V1-V0". Moreover, when the gate signal G4 is turned on, electric current is passed through a passage of C2→S4→C0→S2→L→the battery (C1), so that the both-end voltage VL of the reactor 1 is represented as "V1-(V2-V0)". On the other hand, when a phase difference between the gate signal G3 and the gate signal G4 is 0°, electric current is passed through a passage of C2→54→S3→L→the battery (C1), so that the both-end voltage VL of the reactor 1 is represented as "V1-V2". In this case, there is a relation "V2>V0>V1=Vbat", for example, if it is assumed that "V1=Vbat=200 V", "V0=300 V", and "V2=600 V", when a phase difference between the gate signal G3 and the gate signal G4 is 180°, and when the gate signal G3 is turned on, the both-end voltage VL is represented as "VL=V1-V0=200-300=-100 V", and when the gate signal G4 is turned on, the both-end voltage VL is represented as "VL=V1-(V2-V0)=200-(600-300)=-100 V", and when the phase difference between the gate signal G3 and the gate signal G4 is 0°, the both-end voltage VL is represented as "VL=V1-V2=200-600=-400 V". Therefore, the both-end voltage VL of the reactor 1, in a case where the phase difference between the gate signal G3 and the gate signal G4 is 180°, can be lower than the both-end voltage VL of the reactor 1, in a case where the phase difference between the gate signal G3 and the gate signal G4 is 0°. In other words, when the electric current IL of the reactor 1, the inductance L, and the switching cycle T1 are set as constant values in accordance with the Formula (1), the duty ratio D of the semiconductor switching element, in a case where the phase difference between the gate signal G3 and the gate signal G4 is 180°, can be higher than the duty ratio D of the semiconductor switching element, in a case where the phase difference between the gate signal G3 and the gate signal G4 is 0°. Therefore, an inclination, in which the duty ratio D is varied from 0 to 1, can be increased, so that the soft start time Tsoft1 can be reduced, and each of the voltage values can be early uniformalized.

As described above, the soft start control of each of the switching element $2a$, the switching element $2b$, the switching element $2c$, and the switching element $2d$ is performed, whereby when the low-voltage side voltage V1 is lower than the high-voltage side voltage V1, the V1 and the V2 can be safely uniformalized (the V1 and the V2 can be safely shifted to a direct connection mode) in a state where a voltage sensor is not used, while an over current, which is passed through between the low-voltage side capacitor $3$ (C1) and the high-voltage side capacitor $4$ (C2), is prevented. Moreover, the over current is prevented, whereby each of configuration components can be downsized, and a size and a cost of the overall device can be reduced. Furthermore, the phase difference between the gate signal G3 and the gate signal G4 is 180°, so that the electric current, which is passed through between the capacitors, can be reduced, and the soft start time can be reduced.

Figure 8:
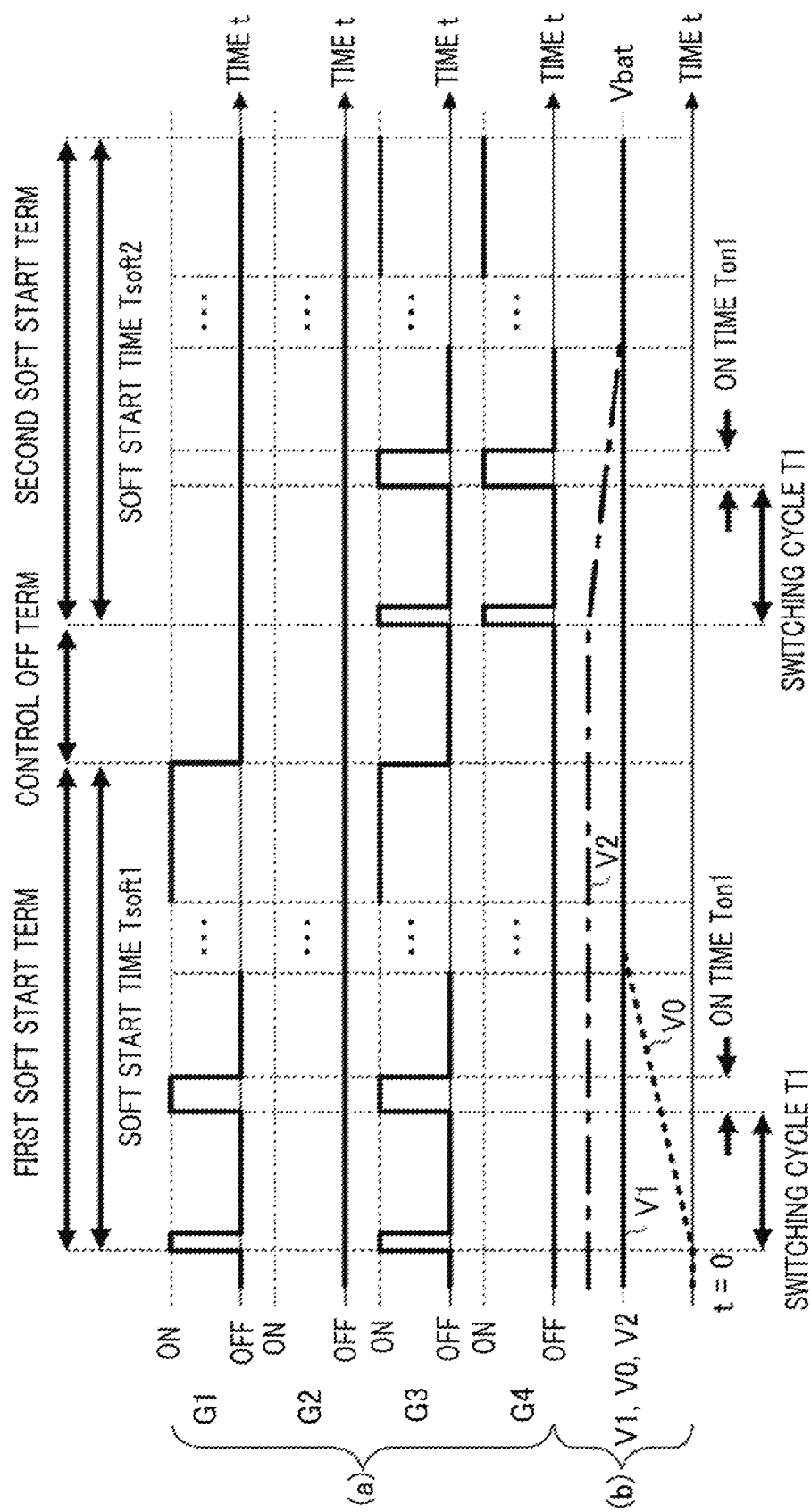
FIG. 8 is a timing chart for explaining soft start control, in accordance with the further other switching pattern, in the DC/DC converter according to Embodiment 1 of the present invention.

Moreover, FIG. 8 is a timing chart for explaining soft start control, in accordance with the further other switching pattern, in the DC/DC converter according to Embodiment 1 of the present invention. A waveform group (a), which is illustrated in FIG. 8, is a timing chart which indicates a switching pattern of each of the semiconductor switching element 2a, the semiconductor switching element 2b, the semiconductor switching element 2c, and the semiconductor switching element 2d, and a waveform group (b), which is illustrated in FIG. 8, is a timing chart which indicates the V1, the V0, and the V2. The switching pattern has a characteristic in which a second soft start term, in which soft start time is Tsoft2, is provided after a first start term. In this case, a control off term, in which the gate signal G1 through the gate signal G4 are set at a low level (off) in order to varies the duty ratio D1 through the duty ratio D4, is provided between the first start term and the second soft start term. For example, the control off term is set as 10 msec. Each of waveforms of the first start term is similar to each of the waveforms indicated in FIG. 5, and the soft start control, in which a phase difference between the gate signal G1 and the gate signal G3 is 0°, is performed, whereby each of voltage values is gradually converged as V0=V1=Vbat. Each of waveforms of the second start term is similar to each of the waveforms indicated in FIG. 6, and the soft start control, in which a phase difference between the gate signal G3 and the gate signal G4 is 0°, is performed, whereby each of voltage values is gradually converged as V2=V0=V1=Vbat. In addition, the soft start time Tsoft2 is similarly determined as the soft start time Tsoft1 is determined.

As described above, the soft start control of each of the switching element 2a, the switching element 2b, the switching element 2c, and the switching element 2d is performed, whereby when the low-voltage side voltage V1 is higher than the middle voltage V0, or the low-voltage side voltage V1 is lower than the middle voltage V0, the V1 and the V0 can be safely uniformalized in a state where a voltage sensor is not used, while an over current, which is passed through between the low-voltage side capacitor 3 (C1) and the charge-discharge capacitor 5 (C0), is prevented. After that, when the low-voltage side voltage V1 is lower than the high-voltage side voltage V2, the V1 and the V2 can be safely uniformalized (the V1 and the V2 can be safely shifted to a direct connection mode) in a state where a voltage sensor is not used, while an over current, which is passed through between the low-voltage side capacitor 3 (C1) and the charge-discharge capacitor 5 (C0), is prevented. Moreover, the over current is prevented, whereby each of configuration components can be downsized, and a size and a cost of the overall device can be reduced. In addition, a method, by which a phase difference of the gate signal G3 and the gate signal G4 is deviated at 180° as indicated in FIG. 7, is applied to the switching pattern which is indicated in FIG. 8, whereby it is needless to say that the soft start time Tsoft2 of the second soft start term can be reduced. Moreover, although the control off term is provided between the first soft start term and the second soft start term, it is suitable that the control off term is not provided, and each of the duty ratio D1 through the duty ratio D4 is varied at a control timing just after the first soft start term is terminated.

Figure 9:
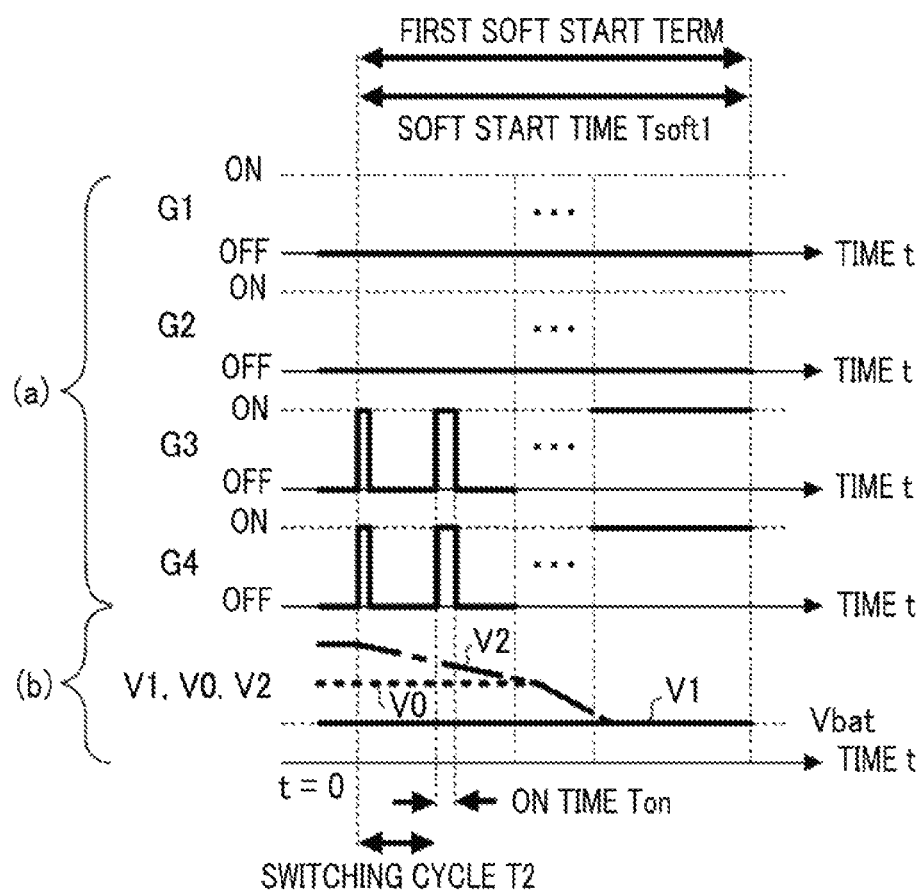
FIG. 9 is a timing chart for explaining soft start control, in accordance with the further other switching pattern, in the DC/DC converter according to Embodiment 1 of the present invention.

Moreover, FIG. 9 is a timing chart for explaining soft start control, in accordance with the further other switching pattern, in the DC/DC converter according to Embodiment 1 of the present invention. A waveform group (a), which is illustrated in FIG. 9, is a timing chart which indicates a switching pattern of each of the semiconductor switching element 2a, the semiconductor switching element 2b, the semiconductor switching element 2c, and the semiconductor switching element 2d, and a waveform group (b), which is illustrated in FIG. 9, is a timing chart which indicates the V1, the V0, and the V2. In the waveform group (a) which is illustrated in FIG. 9, the switching cycle T1 of the timing chart, which is indicated in the waveform group (a) illustrated in FIG. 6, is reduced to a switching cycle T2. Each of frequencies of the triangular wave TW3 and the triangular wave TW4, which is generated from the triangular wave generator 602, is increased by the control means 6 in a state where the frequencies are higher than a frequency at a normal operation, whereby the switching cycle T1 is reduced to the switching cycle T2, and each of the switching cycle of the semiconductor switching element 2c and the semiconductor switching element 2d is increased. Moreover, as indicated in the waveform group (b), which is illustrated in FIG. 9, in a case where each of voltage values is represented as V2>V0>V1=Vbat, which are similar to the voltage values indicated in the waveform group (b), which is illustrated in FIG. 6, in a state where a both-end voltage of the high-voltage battery 51 is the Vbat, and t=0, when the soft start control is started and the gate signal G3 and the gate signal G4 are turned on, electric current is passed through a passage of C2→S4→S3→L→the battery (C1), and the V2 is decreased, and each of voltage values is gradually converged as V2=V0. After that, when the gate signal G3 and the gate signal G4 are turned on, electric current is passed through a passage of C2 (C0) →S3→L→the battery (C1), and the V2 and the V0 are also decreased, and each of voltage values is gradually converged as V2=V0=V1=Vbat.

In this case, when the both-end voltage VL of the reactor 1, the inductance L, and the duty ratio D are set as constant values in the formula (1), a switching frequency of each of the semiconductor switching element 2a and the semiconductor switching element 2d is increased, whereby the electric current IL of the reactor 1 can be reduced. Therefore, when the electric current IL of the reactor 1 is fixed in accordance with a current threshold value of the components of the DC/DC converter 50, the duty ratio D can be increased. In other words, an inclination, in which the duty ratio D is varied from 0 to 1, can be increased, so that the soft start time Tsoft1 can be reduced, and each of the voltage values can be early uniformalized. In addition in this case, although the switching frequency is increased, as one example, with respect to the switching pattern which is indicated in FIG. 6, even when the switching frequency is applied to the switching patterns which are indicated in FIG. 3 through FIG. 5, FIG. 7, and FIG. 8, it is needless to say that the soft start time can be reduced, and each of the voltage values can be early uniformalized.

As described above, in the DC/DC converter 50 according to Embodiment 1, the soft start control, in which at least one of the semiconductor switching elements is gradually varied from 0% to 100% in accordance with a predetermined switching pattern, is performed, and the semiconductor switching element, in which the soft start control is not performed during the term, is turned off, whereby the both-end voltage of each of the capacitors can be safely uniformalized in a state where a voltage sensor is not used, while an over current, which is passed through between the capacitors, is prevented. Moreover, the over current is prevented, whereby each of configuration components can be downsized, and a size and a cost of the overall device can be reduced. Moreover, a phase difference of the gate signals between two semiconductor switching elements, in which the soft start control is performed, is set as 180°, whereby the soft start time can be reduced. Moreover, the switching frequency of each of the semiconductor switching elements is increased, whereby the soft start time can be more reduced. In other words, the both-end voltage of each of the capacitors can be early uniformalized.

In addition, although the block diagram of the control means 6 is illustrated in FIG. 2, the present invention is not limited by a gate signal generation method according to the block diagram, and one example is described, and when the control means 6 has a configuration in which on time of at least one of the semiconductor switching elements is gradually varied from 0% to 100%, and the semiconductor switching element, in which the soft start control is not performed during the term, can be turned off, the other configuration may be used. For example, each of the duty ratios, which are generated by the duty generator 601 composing the control means 6, has not a linear waveform which is linearly varied from 0 to 1, and, for example, an integral waveform, which is determined in accordance with constant values of a capacitor and a resistance, may be used.

Moreover, a method indicated in FIG. 7, by which the phase difference of the gate signals of two switching elements in which the soft start control is performed, is set as 180°, may be applied to the switching pattern indicated in FIG. 5.

Embodiment 2

Hereinafter, a DC/DC converter according to Embodiment 2 of the present invention will be explained.

Figure 10:
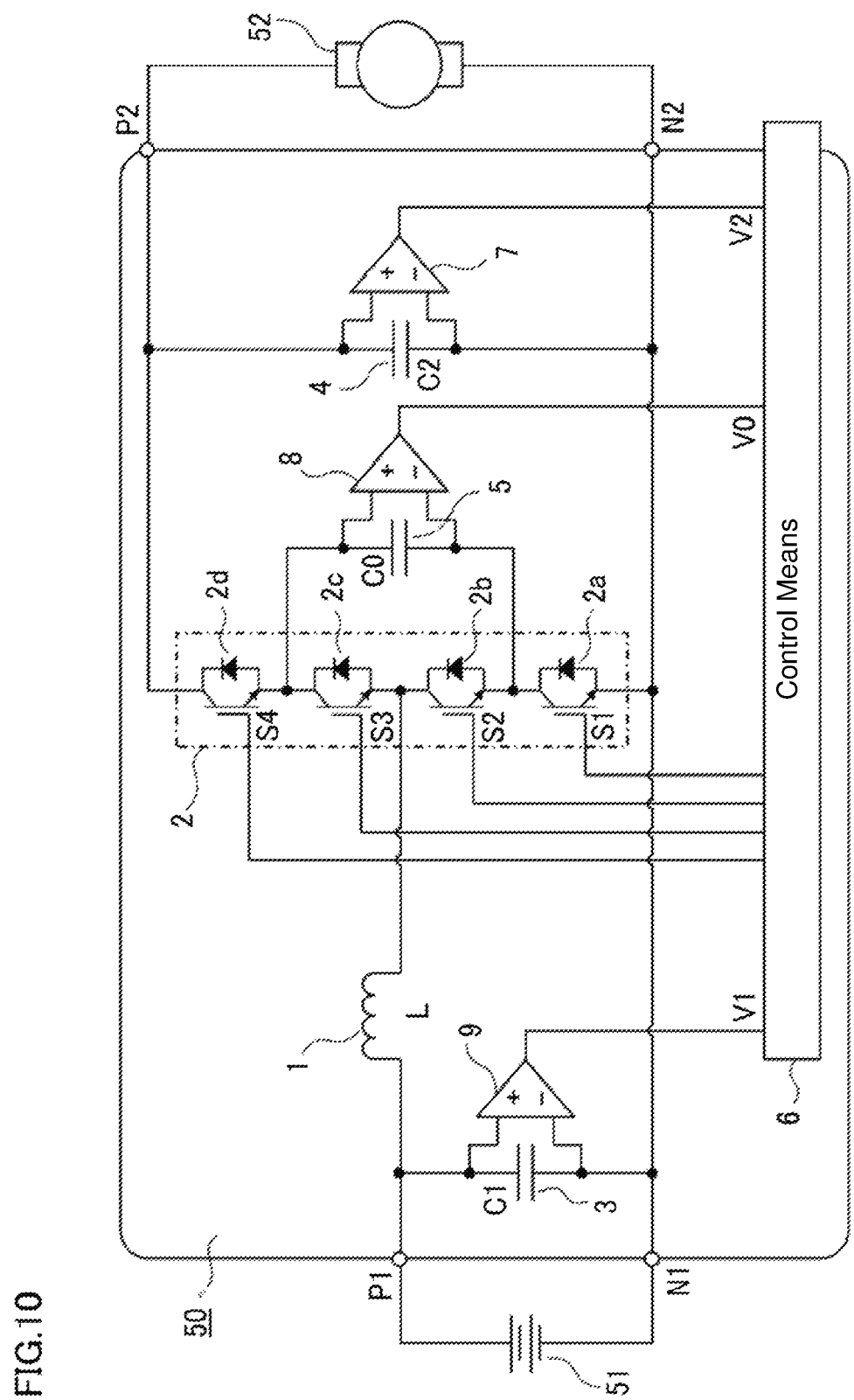
FIG. 10 is a circuit diagram illustrating a DC/DC converter according to Embodiment 2 of the present invention.

FIG. 10 is a circuit diagram of a DC/DC converter for explaining Embodiment 2 of the present invention. In FIG. 10, a voltage sensor 7 for detecting a high-voltage side voltage V2, a voltage sensor 8 for detecting a middle voltage V0, and a voltage sensor 9 for detecting a low-voltage side voltage V1 are added to the circuit diagram according to Embodiment 1, which is illustrated in FIG. 1. The circuit diagram according to Embodiment 2, except for the added voltage sensors, is similar to the circuit diagram according to Embodiment 1, so that an explanation for the circuit diagram is omitted.

A configuration of a control means 6 is similar to a configuration of the control means 6 according to Embodiment 1, which is indicated in FIG. 2. There is an explained example in which the control means 6 outputs a switching pattern, in which a first switching cycle and a second switching cycle, which are indicated in a waveform group (a) illustrated in FIG. 8, are provided, by a duty generator 601 and a triangular wave generator 602. The control means 6 respectively calculates a duty ratio D1 of a semiconductor switching element 2a and a duty ratio D3 of a semiconductor switching element 2c, at a first soft start term, in accordance with an inductance of a reactor 1, a rated current threshold value of a component of which rated current is the smallest, a difference between a detection voltage V1_sen, which is detected by the voltage sensor 9, and a detection voltage V0_sen, which is detected by the voltage sensor 8, and the switching cycle, and the control means 6 respectively calculates the duty ratio D3 of the semiconductor switching element 2c and a duty ratio D4 of a semiconductor switching element 2d, at a second soft start term, in accordance with the inductance of the reactor 1, the rated current threshold value of the component of which rated current is the smallest, a difference between a detection voltage V2_sen, which is detected by the voltage sensor 7, and the detection voltage V1_sen, which is detected by the voltage sensor 9, and the switching cycle.

Figure 11:
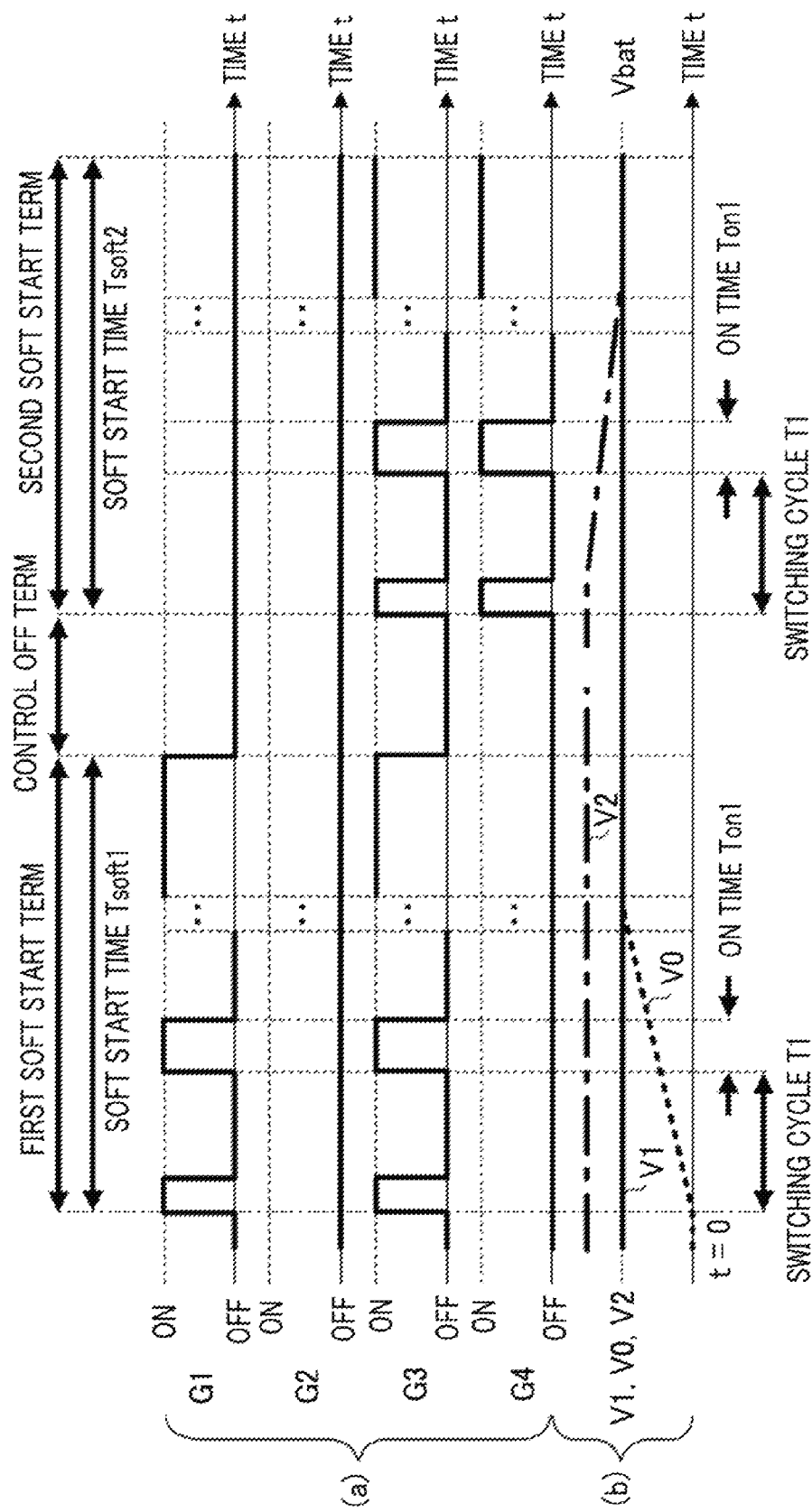
FIG. 11 is a timing chart for explaining soft start control in the DC/DC converter according to Embodiment 2 of the present invention.

FIG. 11 is a timing chart for explaining soft start control in the DC/DC converter according to Embodiment 2 of the present invention. A waveform group (a), which is illustrated in FIG. 11, is a timing chart which indicates a switching pattern of each of a semiconductor switching element 2a, a semiconductor switching element 2b, a semiconductor switching element 2c, and a semiconductor switching element 2d, and a waveform group (b), which is illustrated in FIG. 11, is a timing chart which indicates a V1, a V0, and a V2. Although the waveform group (a) and the waveform group (b), which are illustrated in FIG. 11, are similar to the waveform group (a) and the waveform group (b), which are illustrated in FIG. 8, according to Embodiment 1, as described above, the duty ratios of the semiconductor switching elements are respectively calculated in such a way that the duty ratios are set as a value which does not exceed a rated current threshold value and is directly closed to the threshold value, so that soft start time Tsoft1 and soft start time Tsoft2 can be reduced in comparison with the soft start time Tsoft1 and the soft start time Tsoft2, which are indicated in FIG. 8. In other words, each of the voltage values can be early uniformalized.

In addition in this case, although an example of application is indicated, as one example, with respect to the switching pattern which is indicated in FIG. 8, even when the example of application is applied to the switching patterns which are indicated in FIG. 3 through FIG. 6, it is needless to say that each of the voltage values can be early uniformalized.

Moreover, as indicated in FIG. 9, a switching frequency of a semiconductor switching element is increased during at least one of the first soft start term and the second soft start term, whereby at least one of the soft start time Tsoft1 and the soft start time Tsoft2 can be reduced. In other words, each of the voltage values can be early uniformalized. Moreover, the switching frequency may be increased with respect to the switching patterns which are indicated in FIG. 3 through FIG. 6, and the soft start time may be reduced.

In addition, although the control off term is provided between the first start term and the second soft start term, it is suitable that the control off term is not provided, and each of the duty ratio D1 through the duty ratio D4 is varied at a control timing just after the first start term is terminated.

As described above, in the DC/DC converter 50 according to Embodiment 2, the voltage sensor 9 which measures the both-end voltage V1 of a low-voltage side capacitor 3, the voltage sensor 7 which measures the both-end voltage V2 of a high-voltage side capacitor 4, and the voltage sensor 8 which measures the both-end voltage V0 of a charge-discharge capacitor 5 are further added to the DC/DC converter 50 according to Embodiment 1, and the soft start control, in which at least one of the semiconductor switching elements is gradually varied from 0% to 100% in accordance with a switching pattern which is determined based on a detection value of the voltage sensor, is performed, and the semiconductor switching element, in which the soft start control is not performed during the term, is turned off, whereby the soft start time in the DC/DC converter 50 according to Embodiment 2 can be reduced with respect to the soft start time in the DC/DC converter 50 according to Embodiment 1. In other words, each of the voltages can be early uniformalized.

In addition, in the DC/DC converter 50 according to Embodiment 2, when the soft start control, in which at least one of the semiconductor switching elements is gradually varied from 0% to 100% in accordance with a predetermined switching pattern, is performed as described in Embodiment 1, for example, when the soft start control is performed in accordance with the switching pattern which is indicated in FIG. 8, the voltages are uniformalized as V1=V0 at the first start term, and for example, an absolute value |V1_sen−V0_sen| of a potential difference of a detection value of each of the voltage sensors is calculated, as a result, when the absolute value exceeds a predetermined voltage threshold value, it is judged that the voltage sensor 8 or the voltage sensor 9 is broken, and when the absolute value is lower than the predetermined voltage threshold value, the voltage sensor 8 and the voltage sensor 9 are normal, whereby a fault of the voltage sensor 8 and the voltage sensor 9 can be diagnosed. Moreover, the voltages are uniformalized as V1=V2 at the second soft start term, and for example, an absolute value |V1_sen−V2_sen| of a detection value of each of the voltage sensors is calculated, whereby a fault of the voltage sensor 7 and the voltage sensor 9 can be similarly diagnosed as described above. In other words, the effect described in Embodiment 1 can be realized, and a fault of each of voltage sensors can be diagnosed.

Embodiment 3

Hereinafter, a DC/DC converter according to Embodiment 3 of the present invention will be explained. A circuit configuration according to Embodiment 3 is similar to the circuit configuration according to Embodiment 2, which is indicated in FIG. 10, so that an explanation for the circuit configuration is omitted.

A configuration of a control means 6 is similar to a configuration of the control means 6 according to Embodiment 1, which is indicated in FIG. 2. There is an explained example in which the control means 6 outputs a switching pattern, in which a first switching cycle and a second switching cycle, which are indicated in a waveform group (a) illustrated in FIG. 8, are provided, by a duty generator 601 and a triangular wave generator 602.

Figure 12:
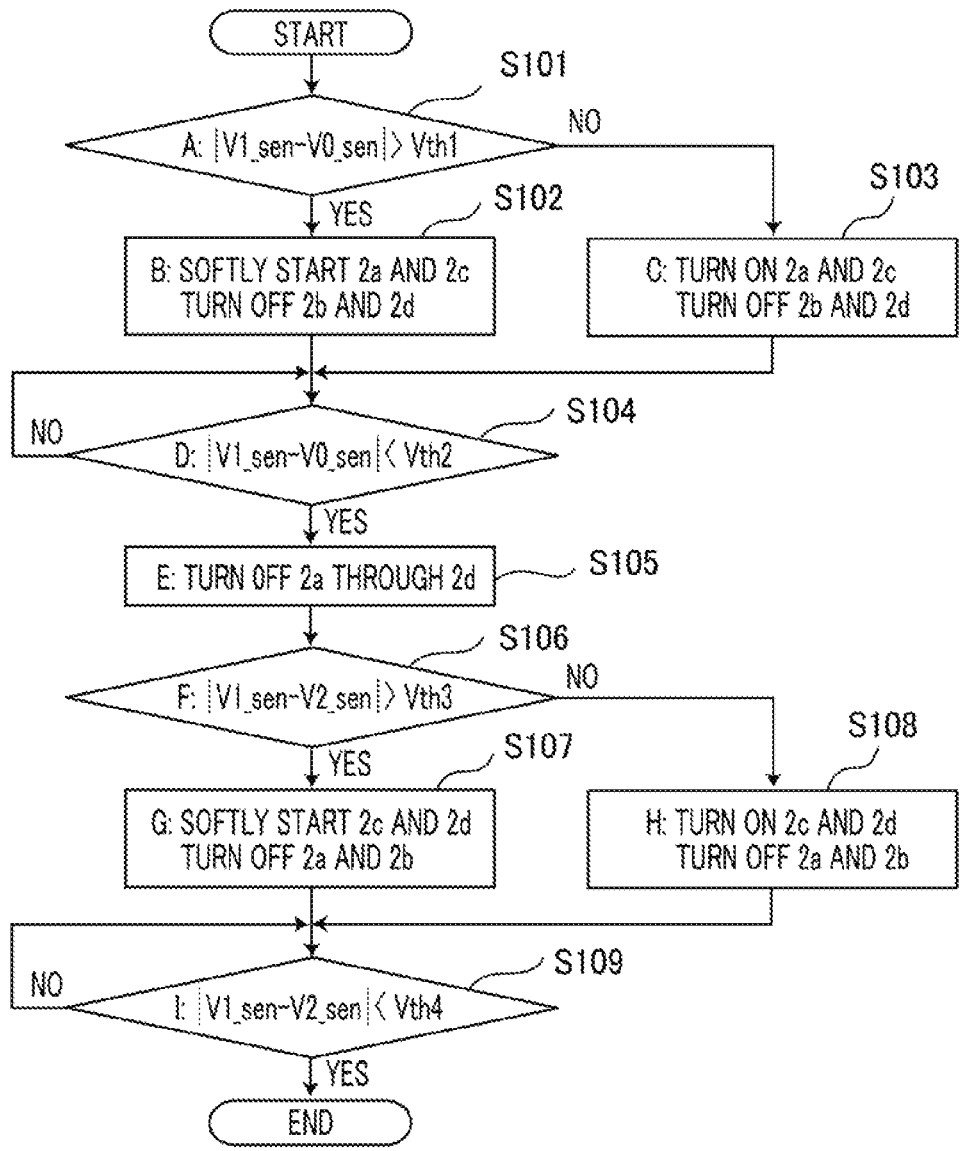
FIG. 12 is a flow chart illustrating an operation of a control means which performs soft start control in a DC/DC converter according to Embodiment 3 of the present invention.

FIG. 12 is a flow chart illustrating an operation of a control means which performs soft start control in a DC/DC converter according to Embodiment 3 of the present invention. In addition, a symbol "2a" through a symbol "2d", which are indicated in the flow chart, represent a semiconductor switching element 2a through a semiconductor switching element 2d. Firstly, a condition A: |V1_sen−V0_sen| is calculated at step S101, and it is decided that a soft start of the semiconductor switching element 2a and the semiconductor switching element 2c is performed or is not performed. When the value of the condition A exceeds a Vth1, the process proceeds to step S102 (the soft start is performed), and when the value of the condition A is lower than or equal to the Vth1, the process proceeds to step S103 (the soft start is not performed). In this case, a symbol "V1_sen" represents a detection voltage which is detected by a voltage sensor 9, and a symbol "V0_sen" represents a detection voltage which is detected by a voltage sensor 8, and a symbol "Vth1" represents a voltage threshold value 1. It is suitable that the Vth1 is previously determined by using a simulation or the like in such a way that when a duty ratio D1 and a duty ratio D3 are 100%, a component, in which a rated electric current is the smallest, is not destroyed, and an electric current, which is passed between the capacitors, is lower than the rated electric current of the component. The soft start control of the semiconductor switching element 2a and the semiconductor switching element 2c is performed at step S102, and the semiconductor switching element 2b and the semiconductor switching element 2d are turned off (condition B). In addition, the switching pattern according to Embodiment 3 is similar to the switching pattern indicated in the waveform group (a) illustrated in FIG. 8, which is indicated in Embodiment 1. The soft start control is not performed at step S103, and the duty ratio D1 and a duty ratio D3, which are generated by the duty generator 601, are constantly set as 1, whereby the gate signal G1 and the gate signal G3 are constantly set as a H level, and the semiconductor switching element 2a and the semiconductor switching element 2c are constantly turned on (condition C). The semiconductor switching element 2b and the semiconductor switching element 2d are constantly turned off (condition C), which are similarly turned off at step S102. A condition D: |V1_sen−V0_sen| is calculated once again at step S104, and when the condition D is lower than a Vth2, the process proceeds to step S105, and when the condition D exceeds the Vth2, the process at step S104 is repeated. In this case, the condition D represents a condition formula by which it is confirmed that the V1_sen and the V0_sen are uniformalized to what extent. The Vth2 represents a voltage threshold value 2, and the Vth2 may be determined in accordance with errors of the voltage sensor 8 and the voltage sensor 9. The semiconductor switching element 2a, the semiconductor switching element 2b, the semiconductor switching element 2c, and the semiconductor switching element 2d are temporarily turned off, for example, during 10 millisecond at step 105 (condition E). A condition |V1_sen−V2_sen| is calculated at step S106, and it is decided the soft start control of the semiconductor switching element 2c and the semiconductor switching element 2d is performed or is not performed (condition F). When the value of the condition exceeds a Vth3, the process proceeds to step S107 (the soft start control is performed), and when the value of the condition is lower than or equal to the Vth3, the process proceeds to step S108 (the soft start control is not performed). In this case, a symbol "V1_sen" represents a detection voltage which is detected by the voltage sensor 9, and a symbol "V2_sen" represents a detection voltage which is detected by the voltage sensor 7, and a symbol "Vth3" represents a voltage threshold value 3. It is suitable that the Vth3 is previously determined by using a simulation or the like in such a way that when a duty ratio D3 and a duty ratio D4 are 100%, a component, in which a rated electric current is the smallest, is not destroyed, and an electric current, which is passed between the capacitors, is lower than the rated electric current of the component. The soft start control of the semiconductor switching element 2c and the semiconductor switching element 2d is performed at step S107, and the semiconductor switching element 2a and the semiconductor switching element 2b are turned off (condition G). In addition, the switching pattern according to Embodiment 3 is similar to the switching pattern indicated in the waveform group (a) illustrated in FIG. 8, which is indicated in Embodiment 1. The soft start control is not performed at step S108, and the duty ratio D3 and a duty ratio D4, which are generated by the duty generator 601, are constantly set as 1, whereby the gate signal G3 and the gate signal G4 are constantly set as a H level, and the semiconductor switching element 2c and the semiconductor switching element 2d are constantly turned off (condition H). The semiconductor switching element 2a and the semiconductor switching element 2b are constantly turned off (condition H), which are similarly turned off at step S107. A condition I: |V1_sen−V2sen| is calculated once again at step S109, and when the condition I is lower than a Vth4, the sequential process is terminated, and when the condition I exceeds the Vth4, the process at step S109 is repeated. In this case, the condition I is a condition formula by which it is confirmed that the V1_sen and the V2_sen are uniformalized to what extent. The Vth4 represents a voltage threshold value 4, and the Vth4 may be determined in accordance with errors of the voltage sensor 7 and the voltage sensor 9. In this case, although the condition E (step S105), which is a control off term, is provided between the condition D (step S104) and the condition F (step S106), it is suitable that the condition E is not provided, and the process proceeds to the condition F (step S106) after the process proceeds to the condition D (step S104).

In addition, when the soft start control is performed in accordance with FIG. 12, a variation of each of the voltage V1, the voltage V0, and the voltage V2 is represented as V2>V1=Vbat>V0 in a state where t=0, and when the condition A and the condition F are established, the variation is similar to the variation of the waveform group (b) which is illustrated in FIG. 8. When the condition A is not established, the voltage V1 and the voltage V0 are instantly uniformalized, and when the condition F is not established, the voltage V1 and the voltage V2 are instantly uniformalized. Therefore, in the DC/DC converter 50 which is indicated in Embodiment 3, when a difference of a detection value of each of the voltage sensors is small at the condition A and condition F in comparison with the DC/DC converter 50 which is indicated in Embodiment 1, the soft start time can be reduced.

Moreover, when the condition D is established, it is judged that the voltage sensor 8 and the voltage sensor 9 are normal, and when the condition D is not established after some repeat counts are passed, it is judged that the voltage sensor 8 or the voltage sensor 9 is broken, whereby a fault of the voltage sensor 8 and the voltage sensor 9 can be diagnosed. Moreover, when the condition I is established, it is judged that the voltage sensor 7 and the voltage sensor 9 are normal, and when the condition I is not established after some repeat counts are passed, it is judged that the voltage sensor 7 or the voltage sensor 9 is broken, whereby a fault of the voltage sensor 7 and the voltage sensor 9 can be diagnosed.

In addition, although the flow chart is indicated in FIG. 12 in a case where the switching pattern, which is indicated in the waveform group (a) illustrated in FIG. 8, is obtained, even when the switching patterns, which are indicated in the waveform group (a) illustrated in FIG. 3 through the waveform group (a) illustrated in FIG. 7, are applied, it is needless to say that the soft start time can be reduced when a difference of a detection value of each of the voltage sensors is small, and a fault of each of the voltage sensors can be diagnosed.

Moreover, as indicated in FIG. 9, a switching frequency of the semiconductor switching element is increased, whereby the soft start time can be reduced. In other words, each of the voltage values can be early uniformalized.

As described above, in the DC/DC converter 50 according to Embodiment 3, the voltage sensor which measures the both-end voltage of a low-voltage side capacitor 3, the voltage sensor which measures the both-end voltage of a high-voltage side capacitor 4, and the voltage sensor which measures the both-end voltage V0 of a charge-discharge capacitor 5 are further added to the DC/DC converter 50 according to Embodiment 1, and it is decided in accordance with a detection value of each of the sensors that the soft start control is performed or the soft start control is not performed, whereby the soft start time in the DC/DC converter 50 according to Embodiment 3 can be reduced with respect to the soft start time in the DC/DC converter 50 according to Embodiment 1. In other words, each of the voltages can be early uniformalized. Moreover, the detection values of each of the voltage sensors are compared, whereby a fault of each of the voltage sensors can be diagnosed.

In addition, the DC/DC converter 50, in which it is decided in accordance with the detection value of each of the sensors, which is indicated in Embodiment 3, that the soft start control is performed or is not performed, can be operated in accordance with a switching pattern which is decided based on the detection value of each of the sensors, which is indicated in Embodiment 2. In this case, time, which is required at step S102 (condition B) and step S107 (condition G), which are indicated in FIG. 12, can be reduced, so that the soft start time, which is required in the DC/DC converter 50 according to Embodiment 3, can be further reduced.

Moreover, in DC/DC converter 50 which is illustrated in FIG. 10, information of the voltage sensor, which is indicated in Embodiment 1, is not used, and the soft start control can be performed in accordance with a predetermined switching pattern. In this case, each of the voltage values can be safely uniformalized, and moreover, a fault of each of the voltage sensors can be diagnosed.

Moreover, in each of the above-described embodiments, although the example, in which each of the semiconductor switching element 2a through the semiconductor switching element 2d is composed of an IGBT and a diode, is explained, a MOSFET, JFET or the like, instead of an IGBT, may be used. When a MOSFET is used, a body diode of a MOSFET, instead of a diode, may be used. Moreover, each of the semiconductor switching element 2a through the semiconductor switching element 2d may be composed of a wide-band-gap semiconductor, of which band gap is larger than a band gap of silicon, for example, such as silicon carbide (Sic), a material of a gallium nitride family, or diamond.

In addition, the present invention is not limited to each of the above-described embodiments, and it is needless to say that the present invention includes all possible combinations of the embodiments, and in the scope of the present invention, it is possible that each of embodiments is freely combined, or each of embodiments is suitably modified or omitted.

What is claimed is:

1. A DC/DC converter comprising:
   a plurality of switching elements;
   a reactor;
   a low-voltage side capacitor;
   a high-voltage side capacitor;
   a charge-discharge capacitor; and
   a controller which drives and controls the switching elements; wherein
   the plurality of switching elements include
   a first switching element having a first terminal connected to a negative pole of the low-voltage side capacitor;
   a second switching element having a first terminal connected to a second terminal of the first switching element, and a second terminal connected to a positive pole of the low-voltage side capacitor via the reactor;

a third switching element having a first terminal connected to the second terminal of the second switching element; and a fourth switching element having a first terminal connected to a second terminal of the third switching element, and a second terminal is connected to a positive pole of the high-voltage side capacitor; wherein the charge-discharge capacitor is connected between a connection point of the first switching element and the second switching element and a connection point of the third switching element and the fourth switching element; and wherein the controller performs soft start control in which a duty ratio of only some of the plurality of switching elements is gradually varied from 0% to 100%, and the other ones of the plurality of switching elements, in which the soft start control is not performed during a term of the soft start control, are turned off, whereby a both-end voltage of the low-voltage side capacitor is made equal to a both-end voltage of the charge-discharge capacitor, or the both-end voltage of the low-voltage side capacitor is made equal to a both-end voltage of the high-voltage side capacitor.

2. The DC/DC converter as recited in claim 1, wherein the controller performs the soft start control of the some of the plurality of switching elements in accordance with a predetermined switching pattern.

3. The DC/DC converter as recited in claim 1, wherein the controller performs the soft start control in a state where a frequency is higher than a frequency at a normal operation.

4. The DC/DC converter as recited in claim 1, wherein the controller performs the soft start control of the first switching element.

5. The DC/DC converter as recited in claim 4, wherein the controller performs the soft start control of the third switching element and the fourth switching element after a first soft start control is terminated.

6. The DC/DC converter as recited in claim 5, wherein the controller sets a phase difference of gate signals of two switching elements of the plurality of switching elements, in which the soft start control is performed, as 180°.

7. The DC/DC converter as recited in claim 1, wherein the controller performs the soft start control of the third switching element.

8. The DC/DC converter as recited in claim 7, wherein the controller performs the soft start control of the third switching element and the fourth switching element after a first soft start control is terminated.

9. The DC/DC converter as recited in claim 8, wherein the controller sets a phase difference of gate signals of two switching elements of the plurality of switching elements, in which the soft start control is performed, as 180°.

10. The DC/DC converter as recited in claim 1, wherein the controller performs the soft start control of the first switching element and the third switching element.

11. The DC/DC converter as recited in claim 10, wherein the controller performs the soft start control of the third switching element and the fourth switching element after a first soft start control is terminated.

12. The DC/DC converter as recited in claim 11, wherein the controller sets a phase difference of gate signals of two switching elements of the plurality of switching elements, in which the soft start control is performed, as 180°.

13. The DC/DC converter as recited in claim 1, wherein the controller performs the soft start control of the third switching element and the fourth switching element.

14. The DC/DC converter as recited in claim 13, wherein the controller sets a phase difference of gate signals of two switching elements of the plurality of switching elements, in which the soft start control is performed, as 180°.

15. The DC/DC converter as recited in claim 1, wherein a first voltage sensor, which measures a both-end voltage V1 of the low-voltage side capacitor, a second voltage sensor, which measures a both-end voltage V2 of the high-voltage side capacitor, and third voltage sensor, which measures a both-end voltage V0 of the charge-discharge capacitor, are provided, and the controller performs the soft start control of the some of the plurality of switching elements in accordance with a predetermined switching pattern.

16. The DC/DC converter as recited in claim 15, wherein the controller determines whether the soft start control is performed or is not performed based on detection values of the first voltage sensor, the second voltage sensor, and the third voltage sensor.

17. The DC/DC converter as recited in claim 1, wherein a first voltage sensor, which measures a both-end voltage V1 of the low-voltage side capacitor, a second voltage sensor, which measures a both-end voltage V2 of the high-voltage side capacitor, and third voltage sensor, which measures a both-end voltage V0 of the charge-discharge capacitor, are provided, and the controller performs the soft start control of the some of the plurality of switching elements in accordance with a switching pattern which is determined based on detection values of the first voltage sensor, the second voltage sensor, and the third voltage sensor.

18. The DC/DC converter as recited in claim 17, wherein the controller determines whether the soft start control is performed or is not performed based on detection values of the first voltage sensor, the second voltage sensor, and the third voltage sensor.

* * * * *